(12) United States Patent
Cartes et al.

(10) Patent No.: US 7,822,857 B2
(45) Date of Patent: Oct. 26, 2010

(54) METHODS AND SYSTEMS FOR SHARING REMOTE ACCESS

(75) Inventors: Andrew C. Cartes, Cypress, TX (US); Andrew Brown, Houston, TX (US); Christopher J. Frantz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 11/221,004

(22) Filed: Sep. 7, 2005

(65) Prior Publication Data

US 2007/0055780 A1  Mar. 8, 2007

(51) Int. Cl.
*G06F 15/16* (2006.01)
(52) U.S. Cl. ..................................... 709/227
(58) Field of Classification Search ............... None
See application file for complete search history.

(56) References Cited

U.S. PATENT DOCUMENTS

| | | | |
|---|---|---|---|
| 5,440,699 A | 8/1995 | Farrand et al. | |
| 5,732,212 A * | 3/1998 | Perholtz et al. | 709/224 |
| 6,222,529 B1 | 4/2001 | Ouatu-Lascar et al. | |
| 6,606,643 B1 * | 8/2003 | Emens et al. | 709/203 |
| 7,003,563 B2 * | 2/2006 | Leigh et al. | 709/223 |
| 7,334,257 B1 * | 2/2008 | Ebrahimi et al. | 726/3 |
| 7,376,747 B2 * | 5/2008 | Hartop | 709/233 |
| 2002/0077801 A1 | 6/2002 | Morehead | |
| 2002/0112038 A1 | 8/2002 | Hessmer et al. | |
| 2003/0002521 A1 * | 1/2003 | Traversat et al. | 370/465 |
| 2003/0050966 A1 * | 3/2003 | Dutta et al. | 709/203 |
| 2003/0051021 A1 | 3/2003 | Hirschfeld | |
| 2003/0061333 A1 | 3/2003 | Dean et al. | |
| 2004/0260790 A1 | 12/2004 | Balloni | |
| 2005/0010696 A1 | 1/2005 | Emerson | |

* cited by examiner

*Primary Examiner*—Ario Etienne
*Assistant Examiner*—Clayton R Williams

(57) ABSTRACT

In one embodiment, a first client device establishes a remote session between a remote computing device and the first client device. One or more subsequent client devices that attempt to establish a remote session with the remote computing device are re-directed to another computing device that serves as a host for the remote session.

25 Claims, 7 Drawing Sheets

METHODS AND SYSTEMS FOR SHARING REMOTE ACCESS

BACKGROUND

One of the problems with providing remote access to a computing device is that typically only one user or client is allowed to remotely access the computing device at a time. Thus, if multiple geographically separated people wish to remotely access the computing device, such is not possible.

Accordingly, this invention arose out of concerns associated with providing methods and systems for sharing remote access to a computing device.

DETAILED DESCRIPTION

Overview

Methods and systems described below permit remote access to a computing device to be shared among more than one user. In one embodiment, a management processor supports a remote session with one client and redirects subsequent clients that attempt to establish a remote session to the one client. A remote session is supported through the notion of a remote console. A remote console is an abstraction that allows a user on a client device to interact with and provide input to and receive output from a remotely accessed computing device. Remote consoles can provide such things as, by way of example and not limitation, user controls for operating the system, as well as configuration, indicators, platform events and status information.

The client to which the others are redirected provides the bandwidth for supporting the remote session for the subsequent clients, thus alleviating the management processor from having to provide bandwidth and other resources to support the subsequent clients.

It is to be appreciated and understood that this inventive embodiments can be employed in connection with any suitable type of computing device. In one specific implementation, the computing device comprises a blade server.

Exemplary Embodiment

In the description that follows, an exemplary management processor is described in the context of one specific implementation example. It is to be appreciated and understood that the inventive embodiments described in this document can be employed with other management processors, without departing from the spirit and scope of the claimed subject matter.

In the example that follows, a management processor known as the "Integrated Lights-Out" or (iLO) management processor is described. The iLO management processor is an autonomous management processor that resides on the system board of a host server and has security features that reside in multiple layers that encompass the hardware, firmware, communication interfaces, and deployment capabilities. The description below describes various components of the management processor to provide some background on but one environment in which the inventive embodiments can be employed. Other exemplary management processor implementations can include, by way of example and not limitation, an add-in adapter, such as a RILOE board (Remote Insight Lights-Out Edition), an external enclosure manager, such as would be used by blade servers, and external equipment, such as a Keyboard/Video/Mouse system/multiplexer. All of these implementations, as well as others that will be apparent to the skilled artisan, could utilize the techniques described herein as a means to enable sharing and monitoring of the remote console of a target.

Figure 1:
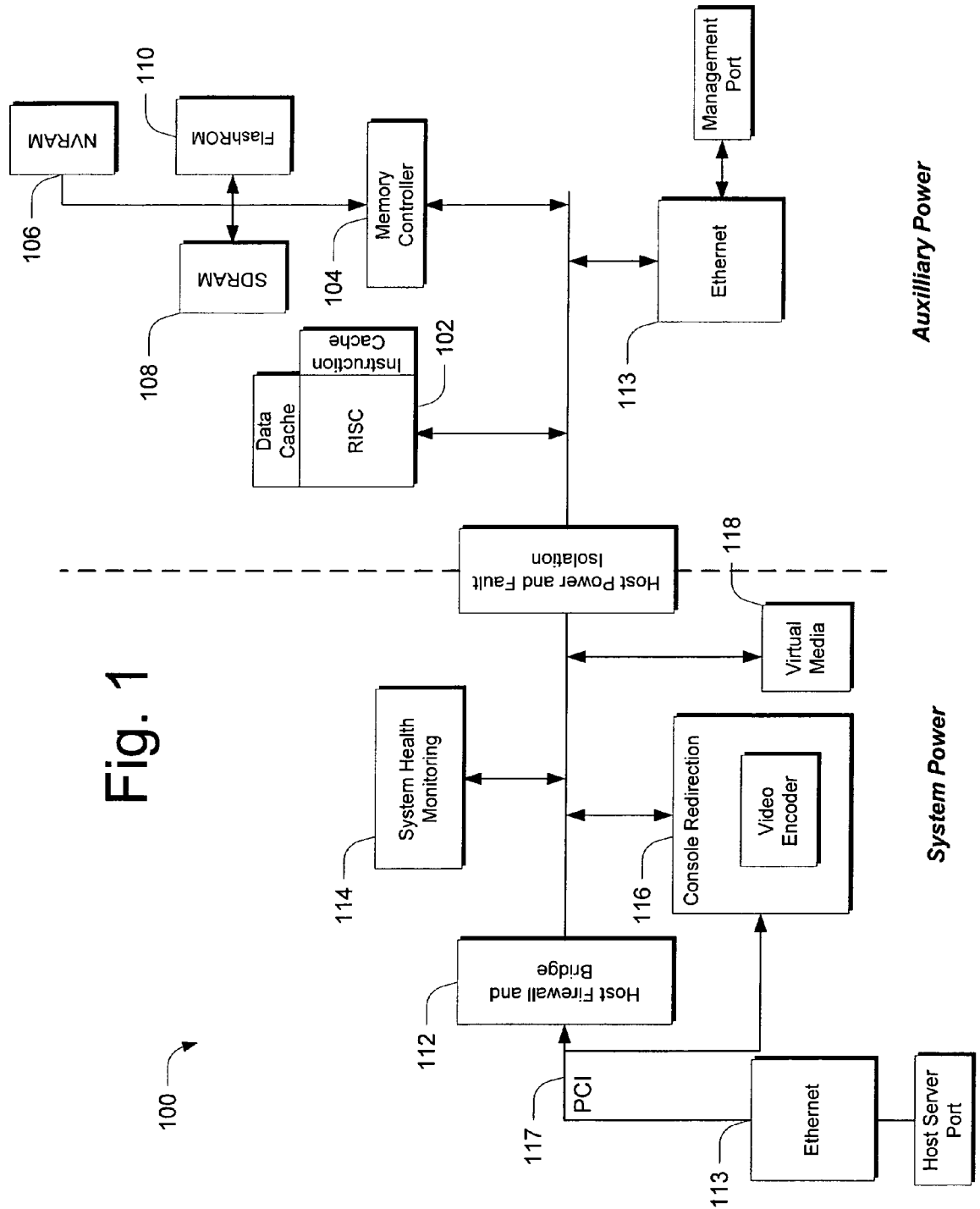
FIG. 1 is a block diagram that illustrates various components of but one exemplary management processor with which various inventive embodiments can be employed.

FIG. 1 shows a block diagram that illustrates, generally at 100, various components of an exemplary iLO management processor. In this example, the iLO processor is a 32-bit, PCI-based ASIC that includes its own 66-MHz RISC processor core 102 with separate instruction and data caches, a memory controller 104, non-volatile RAM or NVRAM 106, Static DRAM or SDRAM 108, FlashROM 110, Host Firewall and Bridge logic 112 and an Ethernet controller 113. Ethernet ports are provided for access to a host server port and management port through which a client can set up a remote session.

In addition, the system includes a system health and monitoring component 114, a console redirection component 116 and a virtual media component 118. The system health and monitoring component 114 monitors sensors and error signals within the server to identify component operation, presence, problems, redundancy, and faults. This enables software running on the host server to take steps to protect data in the event that a server failure is imminent. It also enables remote monitoring of the state of the platform. Console redirection component 116 enables the capture and relay of data to and from the server operator controls to another location—remote, and local. The virtual media component 118 enables the management processor to present storage media to the host server as if it was locally attached from the host perspective, but allows data storage, operation, and control remotely such as over a computer network.

The iLO design denies or restricts access from the host server to the following areas: management ROM, memory, NVRAM, and the iLO management port.

Management ROM

The Management ROM (i.e. flashROM 110) includes the iLO boot block and the iLO main firmware image. The iLO boot block is responsible for the initial hardware and software setup, location and validation of an executable image, and transfer of control to the executable image.

This software running on the management processor has the ability to perform a number of tasks including providing remote access using a web server and presenting a user interface. In addition, the software can enable the use of PCI option ROM, provide a command interpreter, support an operating system for the management processor, provide platform management capabilities and platform operation capabilities, and provide monitoring logic, remote access and security, as will be appreciated by the skilled artisan.

Firewall Logic

The iLO management processor includes a host firewall and bridge logic 112 that enables iLO to control the flow of information between the host server and the management console. The firewall logic protects against unauthorized access through the host system PCI bus 117 and therefore shields sensitive keys and data that are stored in memory and firmware.

Authentication and Authorization Processes for Browser Access

Users can access the key functionality of iLO either through a web browser or through the iLO command-line interface (CLI). When users access iLO through the browser, the iLO management processor can authenticate users differently depending on whether the user logs in through a local account or uses directory services. In either case, every time the user makes a request, iLO can re-evaluate the user's privileges to ensure that the privileges are still valid.

Encryption

The iLO management processor can use, for example, SSL, RC4, and the SSH protocols to ensure privacy of iLO actions, depending on the access modes and types of functions being performed.

The iLO management processor can encrypt all web pages using for example, 128-bit SSL encryption. This ensures that all information and commands issued through the web browser are private.

Sharing a Remote Console Using a Management Processor

In the discussion that follows, remote consoles are used, along with various redirection techniques, to allow multiple clients to participate in the same remote session. Remote access to a computing device is provided by a management processor, which can be the same as, similar to or different from the one described above. The management processor is configured to redirect subsequent clients that attempt to establish a remote session to a different computing device that serves as a host for that session. In at least some embodiments, the different computing device is one of the client devices. In at least some of these embodiments, the client device is the one that first establishes a remote session.

By redirecting subsequent clients to another computing device for the remote session, the management processor can conserve its resources, such as CPU resources, network resources, memory and the like, and offload much of the bandwidth overhead to a presumably more robust machine. This bandwidth overhead can include such things as encryption support for the session, as will become apparent below.

In the discussion that follows, the remote console is described in the context of three resources—a video resource, a keyboard resource and a mouse resource. The video resource includes a representation of the screen of the remotely accessed computing device and is provided to the client devices as an input. The keyboard and mouse resources include the inputs generated from these input devices on the client devices and provided to the remotely accessed computing device to manipulate or otherwise interact with the device. Thus, through a remote session, users are able, via the remote console on their client device, to receive input in the form of a video representation of the screen of the remotely accessed device, and provide input to the remotely accessed device via their keyboard or mouse.

It is to be appreciated and understood that these three resources—the video, keyboard and mouse resources—are provided as but examples of resources that can be utilized in connection with the described inventive techniques. Other resources can be employed without departing from the spirit and scope of the claimed subject matter. Other resources that can be utilized can include, by way of example and not limitation, "unit identifier" indicators, virtualized media, power controls, configuration data access, operation scripts and macros, event logs and traces, other output streams, and synchronization semaphores.

In at least one embodiment, the remote console program is stored as a Java applet that is served from the system's firmware. The applet need not, however, be served from the firmware. For example, a stand-alone Secure Shell (SSH) program can connect to iLO. Accordingly, in some embodiments, controls can be served from the firmware and in other embodiments from outside of the firmware.

Consider now what happens when a single user establishes a remote session. When a remote session is established, for simplicity's sake, consider that each of the resources above utilizes a separate TCP/IP socket. Thus, when one user establishes a remote session, three TCP/IP sockets are employed for each of the respective resources. As more and more users join the remote session, more and more TCP/IP sockets are required for each user's resources and, if the management processor does not offload this overhead, the management processor would have to support all of the required TCP/IP sockets. Needless to say, as will be appreciated by the skilled artisan, this solution does not scale economically and becomes prohibitively expensive for the management processor as more and more users join the session. In addition to managing the increased overhead associated with the added sockets, the management processor would also have to manage overhead associated with authentication records, synchronization logic, data encryption state information, and processor time, to name just a few.

Figure 2:
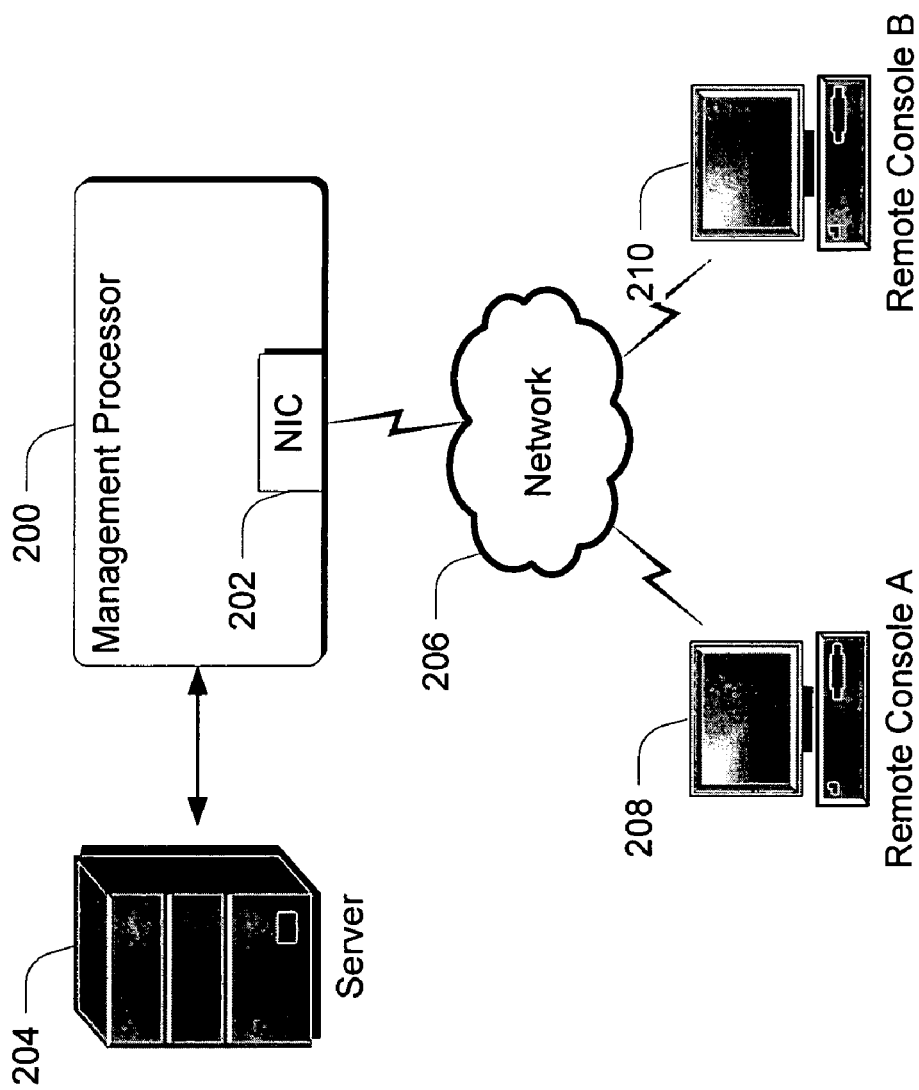
FIG. 2 is a diagram that illustrates an exemplary system which can share a remote console in accordance with one embodiment.

Consider now FIG. 2 which shows an exemplary system that includes a management processor 200 having a network interface card 202 that permits network access to the management processor and hence, one or more computing devices, such as server 204. In this example, the network interface card 202 permits access through a network 206 for multiple different client devices or remote consoles 208, 210 (Remote Console A, Remote Console B, respectively). In the illustrated and described embodiment, network 206 can comprise any suitable network or type of network. In this particular example, network 206 comprises the Internet.

Figure 3:
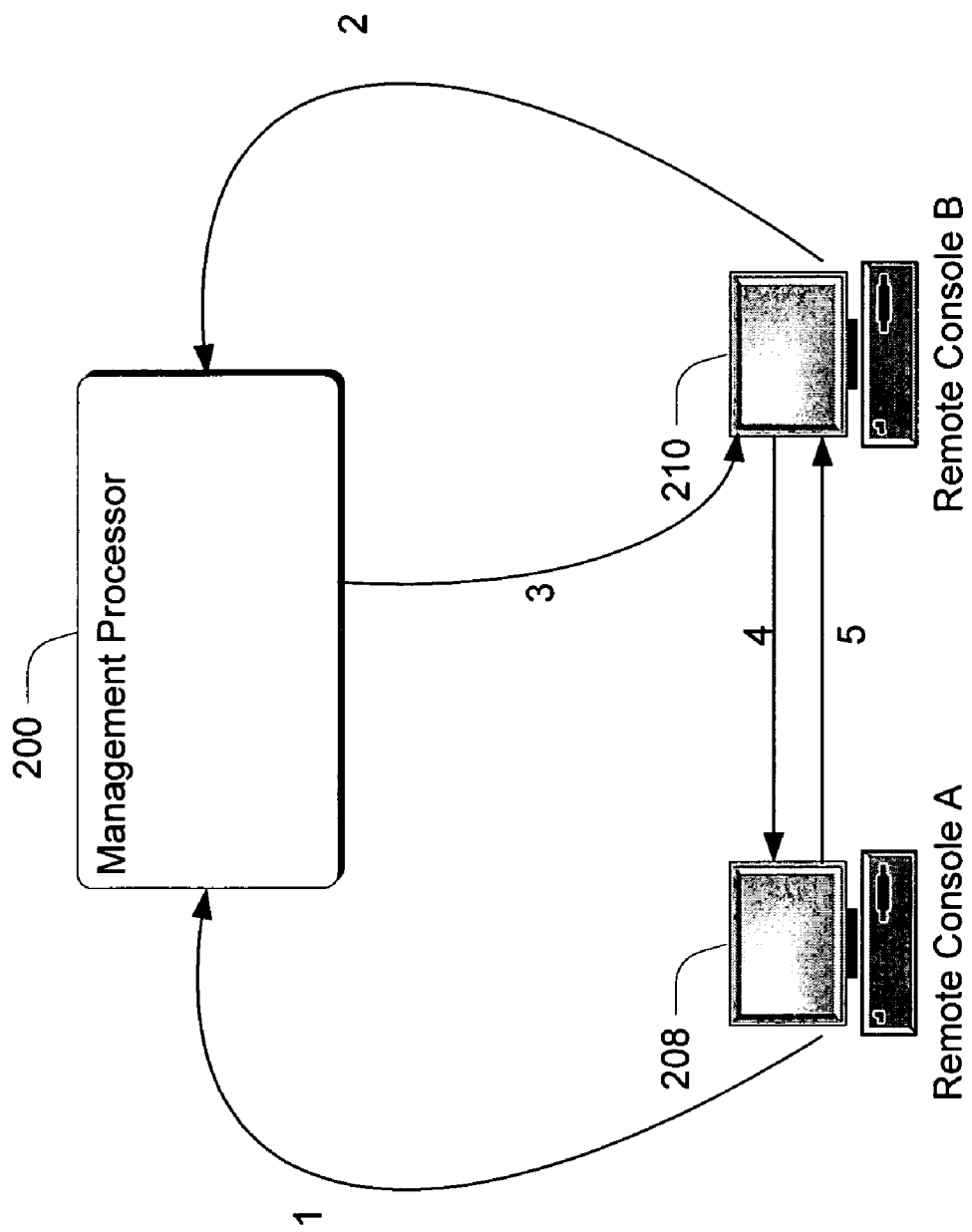
FIG. 3 is a diagram that illustrates a communication flow in the system of FIG. 2 to establish a remote session in accordance with one embodiment.

Consider now FIG. 3 which illustrates a communication flow between management processor 200 and remote consoles 208, 210 in accordance with one embodiment. In this example, communication between and among the management processor and remote consoles takes place via network 206 (FIG. 2) which has been removed from FIG. 3 for simplicity.

In communication path 1, a remote console connection is established between client device 208 and management processor 200. In this particular example, management processor 200 has a web server that it executes and the user of client device 208 browses, using a browser client, to the web server. By browsing to the web server on the management processor, the user launches a program that is provided via the web server that allows them to take remote console control of that system. In this particular example, the program that is launched is a Java program or applet that runs on the client device and attempts to open a network connection that is a TCP/IP connection to a network socket that is hosted by the management processor. However, the remote console program could be embodied in other forms, such as an ActiveX control or some type of machine code that enables remote control from the chosen client system.

To open a network connection, the client device connects to a remote console port on the management processor after which a standard handshake sequence is utilized to establish a connection, synchronization and authentication with the management processor to establish the remote session. Over this connection, encrypted data can be sent back and forth between the management processor 200 and the remote console applet running on client device 208.

At this point, the management processor 200 continues to execute the web server which allows other users, through other client devices, to attempt to connect to the management processor and participate in the remote session that is underway. To do so, a user of client device 210 would access, via communication path 2, the management processor 200 and activate the same remote console program, which would attempt to perform the handshake over the network and start taking control of the remote system. During this process, however, the management processor 200 notifies the remote client device 210, via communication path 3, that it needs to try to connect to a different computing device on the network. Hence, client device 210 is redirected to another computing device on the network. During the redirection, the management processor 200 provides client device 210 with the other computing device's network address, port number and other pertinent information. Optionally, a message can be sent from the management processor 200 to client device 208 to anticipate another connection from client device 210. This optional message may include a secret shared by client device 210 so that client device 208 can authenticate it. The optional message may also contain other operating parameters for use by client device 210. Such other operating parameters can include, by way of example and not limitation, parameters describing the host platform name, host OS information, control ownership, synchronization data, encryption key state information and transaction IDs, current output state (screen data, indicators, event logs, environmental data), connection profile, and throughput, performance, connections, latency, and the like.

Client device 210 then attempts, via communication path 4, to reconnect to the network address and port number of client device 208. Here, client device 210 can attempt a handshake with client device 208, via communication path 5, during which various secrets, parameters and other information can be exchanged. If the handshake is successful, then a connection is established between client device 210 and client device 208. To establish this connection, client device 210 opens a network port on client device 208 through which the handshake takes place.

Figure 4:
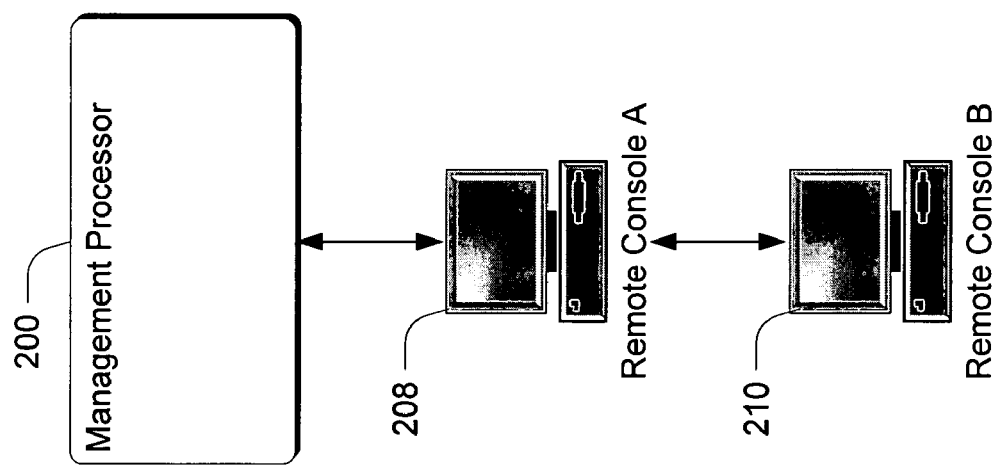
FIG. 4 is a diagram that illustrates one connection arrangement for sharing a remote console in accordance with one embodiment.

FIG. 4 illustrates the system of FIG. 3 after successful completion of the handshake. In this example, remote console data is relayed from client device 208 to client device 210 so that client device 210 can render the remote console.

It is to be appreciated and understood that the connection order of the client devices can be changed in accordance with a number of factors. For example, due to network latency issues, a different connection order might be selected. In addition, as more and more client devices participate in a particular remote session, the connection order might be modified to address such things as network latency issues.

Supporting Subsequent Remote Consoles

Figure 5:
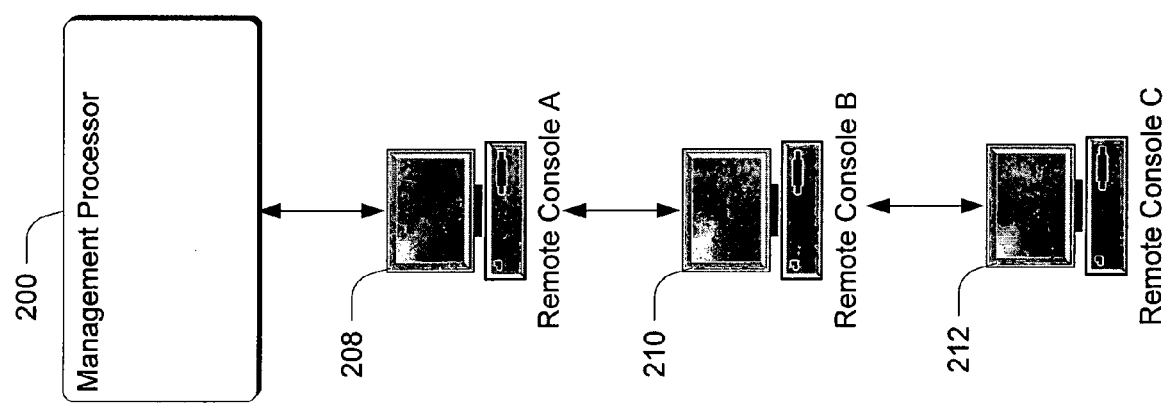
FIG. 5 is a diagram that illustrates another connection arrangement for sharing a remote console in accordance with one embodiment.

Given the connection order described above, additional subsequent remote consoles can be supported in different arrangements. As an example, consider FIG. 5. There, a third client device 212 is provided and is connected through client device 210 in a daisy-chain type of connection order. In this example (as well in other arrangements), if a middle node drops off—such as remote console B—other nodes that are connected through the dropped off node can attempt to reconnect to other still-connected nodes, such as the one associated with remote console A.

Figure 6:
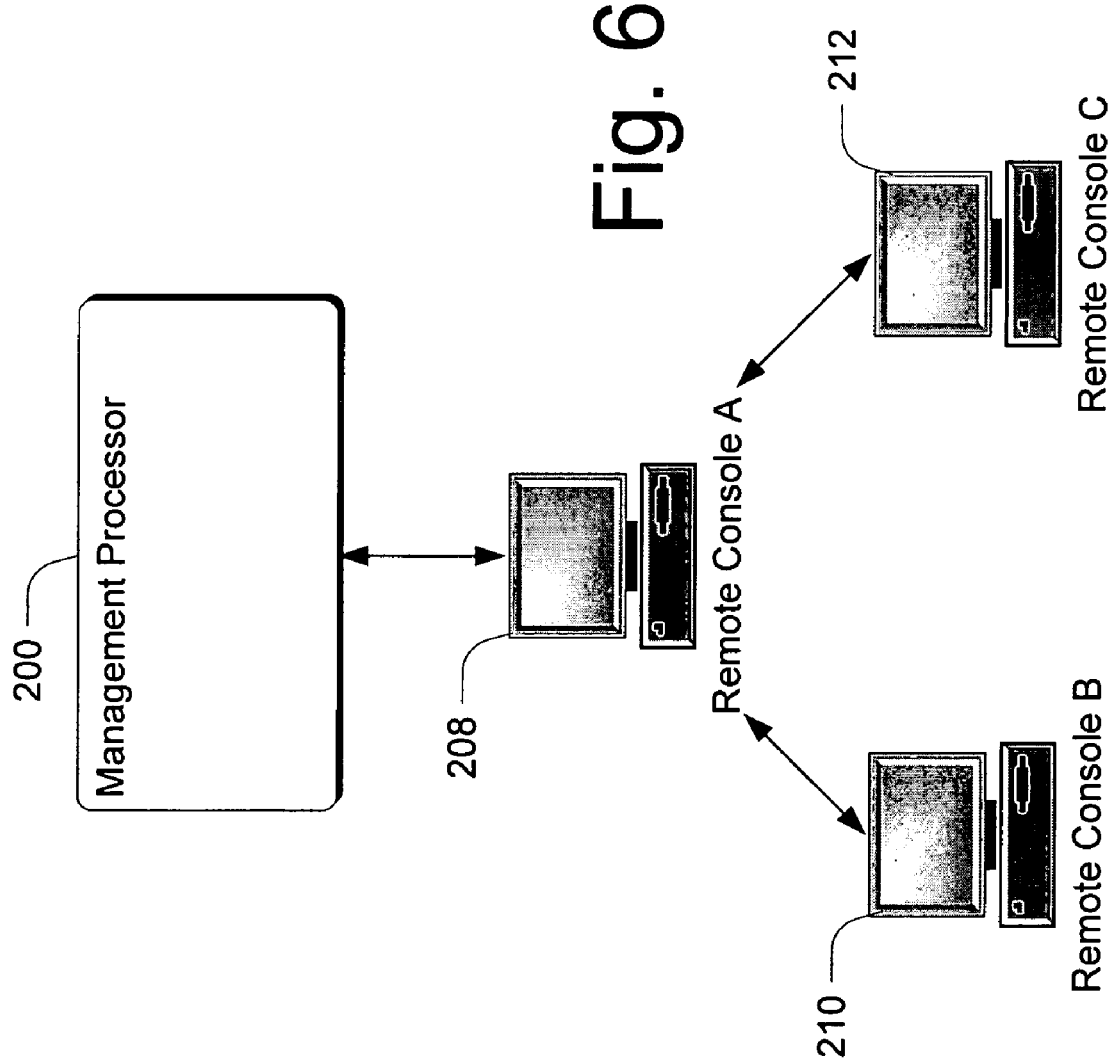
FIG. 6 is a diagram that illustrates one connection arrangement for sharing a remote console in accordance with one embodiment.

Alternately or additionally, consider the connection arrangement of FIG. 6. There, third client device 212 connects with client device 208 in a fan out type of connection order. One advantage of this type of arrangement is that there is lower network latency due to there being fewer hops between client devices.

In each of the arrangements above, the subsequent client devices are connected in much the same way as was described above—through a redirection by the management processor.

Other arrangements can include a multicast arrangement. In this particular arrangement, if an additional connection is made, then a redirection step can add a new node for the connection to an associated multicast group.

Exemplary Method

Figure 7:
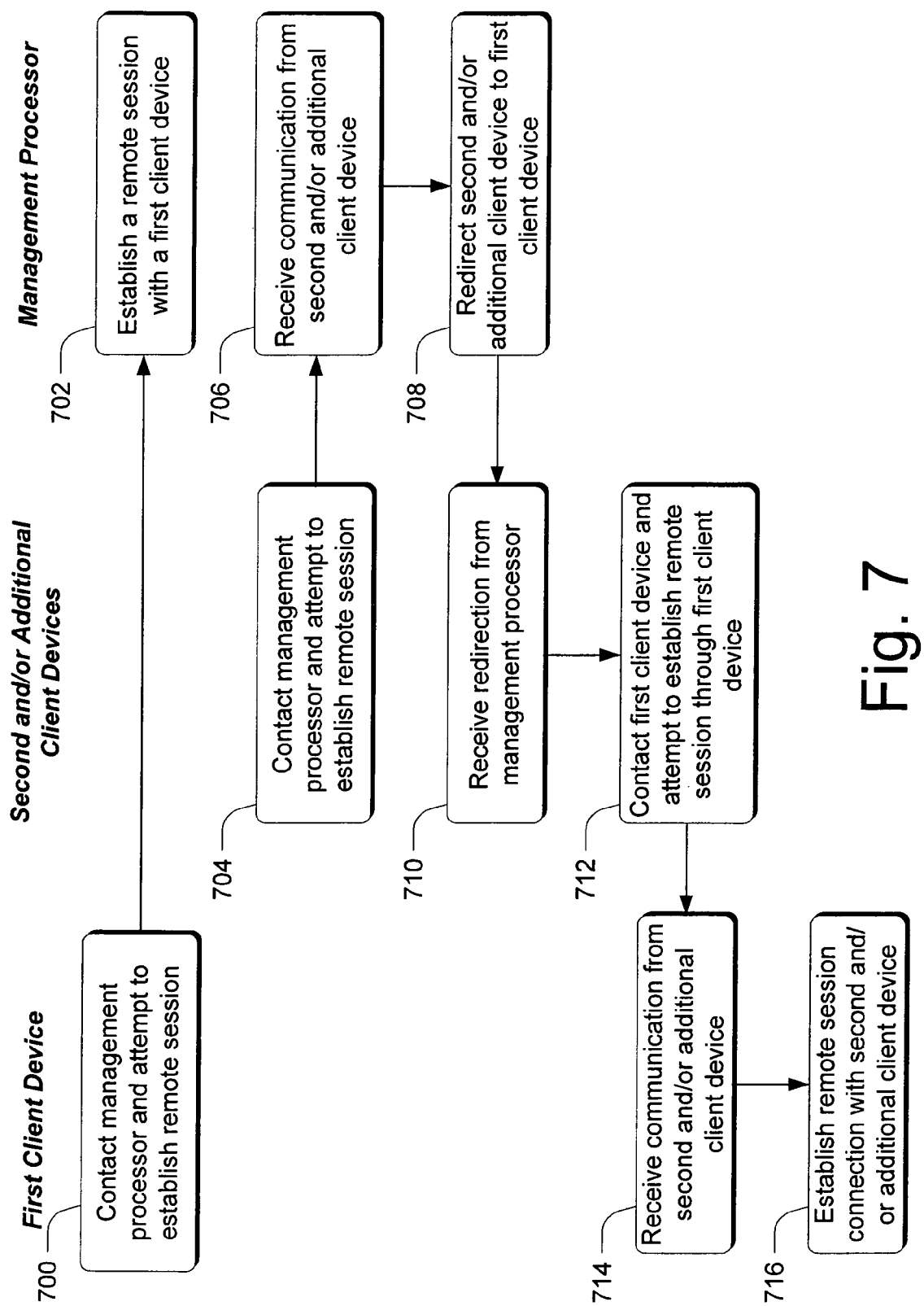
FIG. 7 is a flow diagram that illustrates steps in a method in accordance with one embodiment.

FIG. 7 is a flow diagram that describes steps in a method in accordance with one embodiment. The method can be implemented in connection with any suitable hardware, software, firmware or combination thereof. In but one embodiment, the method is implemented in software in the form of instructions that reside on some type of computer-readable media. Such instructions can be executed in connection with systems that are the same as, similar to or different from those described above.

In the description that follows, the method is described in connection with the various entities that can perform the various actions. For example, under the heading "First Client Device" appear actions that are executed by a first client device. Similarly, under the headings "Second and/or Additional Client Devices" and "Management Processor" appear actions that are executed by a second and/or additional client device and a management processor respectively.

Step 700 contacts a management processor and attempts to establish a remote session. This step is performed by a first client device and can be performed in any suitable way, examples of which are given above. Step 702 establishes a remote session with the first client device. This step can be performed in any suitable way, examples of which are given above. Step 704 contacts the management processor and attempts to establish a remote session. This step is performed by a second and/or additional client device and can be performed in any suitable way, examples of which are given above.

Step 706 receives the communication from the second and/or additional client device and step 708 redirects the second and/or additional client device to the first client device. It is to be appreciated and understood that this step could redirect the second and/or additional client device to a computing device that is different from the first client device, as noted above.

Step 710 receives, with the second and/or additional client device, the redirection from the management processor. This step can be performed in any suitable way, examples of which are given above. Step 712 contacts the first client device and attempts to establish a remote session through the first client device.

Step 714 receives, with the first client device, communication from the second and/or additional client device. This step can be performed in any suitable way, examples of which are given above. Step 716 establishes a remote session connection with the second and/or additional client device. In at least some embodiments, the first client device can handle encryption functionality for the second or additional client devices. For example, typically, the management processor will encrypt data that it sends to the first client device. The first client device can then decrypt the data, process it and, if appropriate, re-encrypt data for transmission to the second and/or additional client devices. Similarly, the first client device can receive encrypted data back from the second and/or additional client devices and either pass the encrypted data on to the management processor, or decrypt, process, re-encrypt and send the re-encrypted data on to the management processor. In this way, encryption/decryption overhead is passed on to the first client device. In at least some embodiments, the first client device can choose to pass on the original data using the same cipher.

In this example, the first client device serves as a host for the second and/or additional client devices.

Extensions

While the discussion above tends to describe the client connection order as occurring in a somewhat chronological order, it is to be appreciated and understood that the parameters that are exchanged during a session might indicate that a different order is preferable because of capability, latency, throughput, firewalls, routing concerns and the like. For example, if user A connects from a WAN, and user B attempts to connect through a LAN, it might make sense to re-order the connection order B-A.

CONCLUSION

The above described systems and methods can conserve the resources of a management processor by offloading the overhead of supporting multiple shared remote sessions to another computing device. In addition, various embodiments can permit remote console "record and playback" by allowing a different system to monitor, record, and play back an associated data stream. A program connected to monitor the remote console could also perform security-related monitoring.

Aspects of the described embodiments can be utilized to allow various types of other different computing systems to be shared such as, for example, client desktop systems, as well as client/server applications. In addition, while the described embodiments are described in the context of management processors, it is to be appreciated and understood that other entities can utilize the remoting functionality without departing from the spirit and scope of the claimed subject matter such as, for example, network applications.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A computer-implemented method comprising:
   establishing a remote session between a remote computing device and a first client device;
   redirecting a second client device, by the remote computing device, that attempts to establish a direct remote session with the remote computing device to the first client device to establish a connection therebetween such that the second client device establishes a remote session with the remote computing device through the first client device; and
   the remote computing device interacting with and receiving input device data from and providing output video data to the first and second client devices, wherein communication between the remote computing device and the second client device is passed through the first client device, and wherein an overhead task associated with the communication between the remote computing device and the second client device is offloaded to the first client device such that the first client device performs the overhead task on behalf of the remote computing device, wherein the communication between the remote computing device and the second client device includes the input device data from the second client device and the output video data to the second client device, wherein the input device data from the second client device is responsive to input device manipulation at the second client device, wherein the output video data to the second client device is for display by the second client device, wherein the input device data from the first client device is responsive to input device manipulation at the first client device, and the output video data to the first client device is for display by the first client device.

2. The method of claim 1, wherein the act of establishing comprises authenticating a user of the first client device.

3. The method of claim 1, wherein said redirecting causes a daisy chain connection to be established between the first client device and the second client device.

4. The method of claim 1, wherein said redirecting causes a fan out connection to be established between the first client device and the second client device.

5. The method of claim 1, wherein the remote computing device comprises a server.

6. The method of claim 1, wherein the remote computing device comprises a blade server.

7. A computer-implemented method comprising:
   contacting, by a first client device, a management processor to establish a remote session between the first client device and a remote computing device;
   establishing the remote session between the first client device and the remote computing device using the management processor;
   receiving, by the first client device, a communication from a second client device, wherein the second client device has been redirected by the management processor to the first client device in response to the second client device attempting to establish a remote session with the remote computing device;
   responsive to said receiving, establishing a connection between the first client device and the second client device such that the second client device establishes a remote session with the remote computing device through the first client device, the first client device interacting with and providing input device data to and receiving output video data from the remote computing device, wherein the output video data is for display by the first client device, and the input device data is produced responsive to input device manipulation at the first client device; and
   the first client device performing an overhead task that has been offloaded from the remote computing device to the first client device, wherein the offloaded overhead task performed by the first client device is associated with the second client device interacting with and providing input device data to and receiving output video data from the remote computing device, wherein the output video data received by the second client device is for display by the second client device, and the input device data provided by the second client device is responsive to input device manipulation at the second client device.

8. The method of claim 7, wherein establishing the connection between the first client device and the second client device comprises encrypting data from the management processor and intended for the second client device and transmitting the encrypted data from the first client device to the second client device.

9. The method of claim 7, wherein establishing the connection between the first client device and the second client device comprises establishing a daisy-chain connection.

10. The method of claim 7, wherein establishing the connection between the first client device and the second client device comprises establishing a fan out connection.

11. The method of claim 7, wherein the remote computing device comprises a server.

12. The method of claim 7, wherein the remote computing device comprises a blade server.

13. The method of claim 1, wherein the overhead task offloaded to the first client device is one or more of an authentication task, a synchronization task, and an encryption task performed with respect to the communication between the remote computing device and the second client device.

14. The method of claim 1, wherein the remote computing device receives input from and provides output to the first and second client devices in the same remote session.

15. The method of claim 7, wherein the overhead task offloaded to the first client device is one or more of an authentication task, a synchronization task, and an encryption task performed with respect to communication including the input device data from and output video data to the second client device between the remote computing device and the second client device that passes through the first client device.

16. The method of claim 7, wherein the first client device interacts with and provides input device data to and receives output video data from the remote computing device in a shared remote session in which the second client device also interacts with and provides input device data to and receives output video data from the remote computing device.

17. A remote computing device comprising:
a network interface to connect to a network; and
a processor to:
establish a remote session between the remote computing device and a first client device;
receive an attempt from a second client device to establish a remote session;
in response to the attempt from the second client device, redirect the second client device to the first client device to cause the second client device to establish a connection with the first client device to provide a remote session between the remote computing device and the second client device through the first client device; and
receive input device data from and provide output video data to the first and second computing devices, wherein the input device data from and output video data to the second computing device pass through the first client device, wherein an overhead task is offloaded from the remote computing device to the first client device such that the first client device performs the offloaded overhead task that is associated with the remote computing device performing one of receiving input device data from and providing output video data to the second client device, wherein the input device data from the second client device is responsive to input device manipulation at the second client device, wherein the output video data to the second client device is for display by the second client device, wherein the input device data from the first client device is responsive to input device manipulation at the first client device, and the output video data to the first client device is for display by the first client device.

18. The remote computing device of claim 17, wherein the offloaded overhead task is one or more of an authentication task, a synchronization task, and an encryption task performed with respect to communication between the remote computing device and the second client device that passes through the first client device, wherein the communication includes the input device data from and the output video data to the second client device.

19. The remote computing device of claim 17, wherein the processor is to receive input from and provide output to the first and second client devices in the same remote session.

20. The method of claim 1, further comprising:
redirecting a third client device, by the remote computing device, that attempts to establish a direct remote session with the remote computing device to the second client device to establish a connection between the third client device and the second client device such that the third client device establishes a remote session with the remote computing device through the first and second client devices; and
the remote computing device interacting with and receiving input device data from and providing output video data to the third client device, where the input device data from the third client device and the output video data to the third client device are passed through the first and second client devices, where the input device data from the third client device is responsive to input device manipulation at the third client device, where the output video data to the third client device is for display by the third client device, and where an overhead task associated with receiving the input device data and providing the output video data between the remote computing device and the third client device is offloaded to be performed by the second client device.

21. The method of claim 20, wherein each of the overhead task offloaded to the first client device and the overhead task offloaded to the second client device, is one or more of an authentication task, a synchronization task, and an encryption task performed with respect to the respective input device data and output video data.

22. The method of claim 7, further comprising:
communicating, by the first client device, input device data from a third client device and output video data to the third client device, wherein the output video data to the third client device is for display by the third client device, wherein the input device data from the third client device is responsive to input device manipulation at the third client device, wherein the output video data to the third client device and input device data from the third client device are communicated with the remote computing device through the first and second client devices, and wherein an overhead task associated with communication including the output video data to the third client device and input device data from the third client device is offloaded to be performed by the second client device.

23. The method of claim 22, wherein each of the overhead task offloaded to the first client device and overhead task offloaded to the second client device is one or more of an authentication task, a synchronization task, and an encryption task performed with respect to the respective input device data and output video data.

24. The remote computing device of claim 17, wherein the processor is to further:

redirect a third client device that attempts to establish a remote session with the remote computing device to the second client device to establish a connection between the third client device and the second client device such that the third client device establishes a remote session with the remote computing device through the first and second client devices; and receive input device data from and provide output video data to the third client device, where the input device data from the third client device and the output video data to the third client device are passed through the first and second client devices, where the input device data from the third client device is responsive to input device manipulation at the third client device, where the output video data to the third client device is for display by the third client device, and where an overhead task associated with receiving the input device data and providing the output video data between the remote computing device and the third client device is offloaded to be performed by the second client device.

25. The remote computing device of claim 24, wherein each of the overhead tasks offloaded to the first client device and the overhead task offloaded to the second client device is one or more of an authentication task, a synchronization task, and an encryption task performed with respect to the respective input device data and output video data.

* * * * *